United States Patent [19]

Takahashi et al.

[11] Patent Number: 5,309,705
[45] Date of Patent: May 10, 1994

[54] FLAT TOP CONVEYOR CHAIN

[75] Inventors: Toshio Takahashi, Toyonaka; Masaaki Ikeda, Daito; Katsutoshi Shibayama, Osaka; Kenji Kose, Higashi-Osaka, all of Japan

[73] Assignee: Tsubakimoto Chain Co., Osaka, Japan

[21] Appl. No.: 87,608

[22] Filed: Jul. 6, 1993

[51] Int. Cl.⁵ .................. F16G 13/00; B65G 17/40
[52] U.S. Cl. ................................ 59/78; 59/900; 198/851
[58] Field of Search ............... 198/849, 850, 851; 59/78, 900

[56] References Cited

U.S. PATENT DOCUMENTS

| | | | |
|---|---|---|---|
| 4,436,200 | 3/1984 | Hodlewsky et al. | 198/851 |
| 4,893,709 | 1/1990 | Schroeder et al. | 198/852 |
| 5,213,203 | 5/1993 | Kinney et al. | 198/850 |

Primary Examiner—David Jones
Attorney, Agent, or Firm—Eugene E. Renz, Jr.

[57] ABSTRACT

A flat top conveyor chain comprising a plurality of flat top links, each link having flat top surface for carrying articles. The links are chained by means of connecting pins to form a conveyor chain. The flat top link each are made from a polyacetal resin material having a long chain alkyl ester based lubricant therein.

2 Claims, 3 Drawing Sheets travel direction travel direction
←

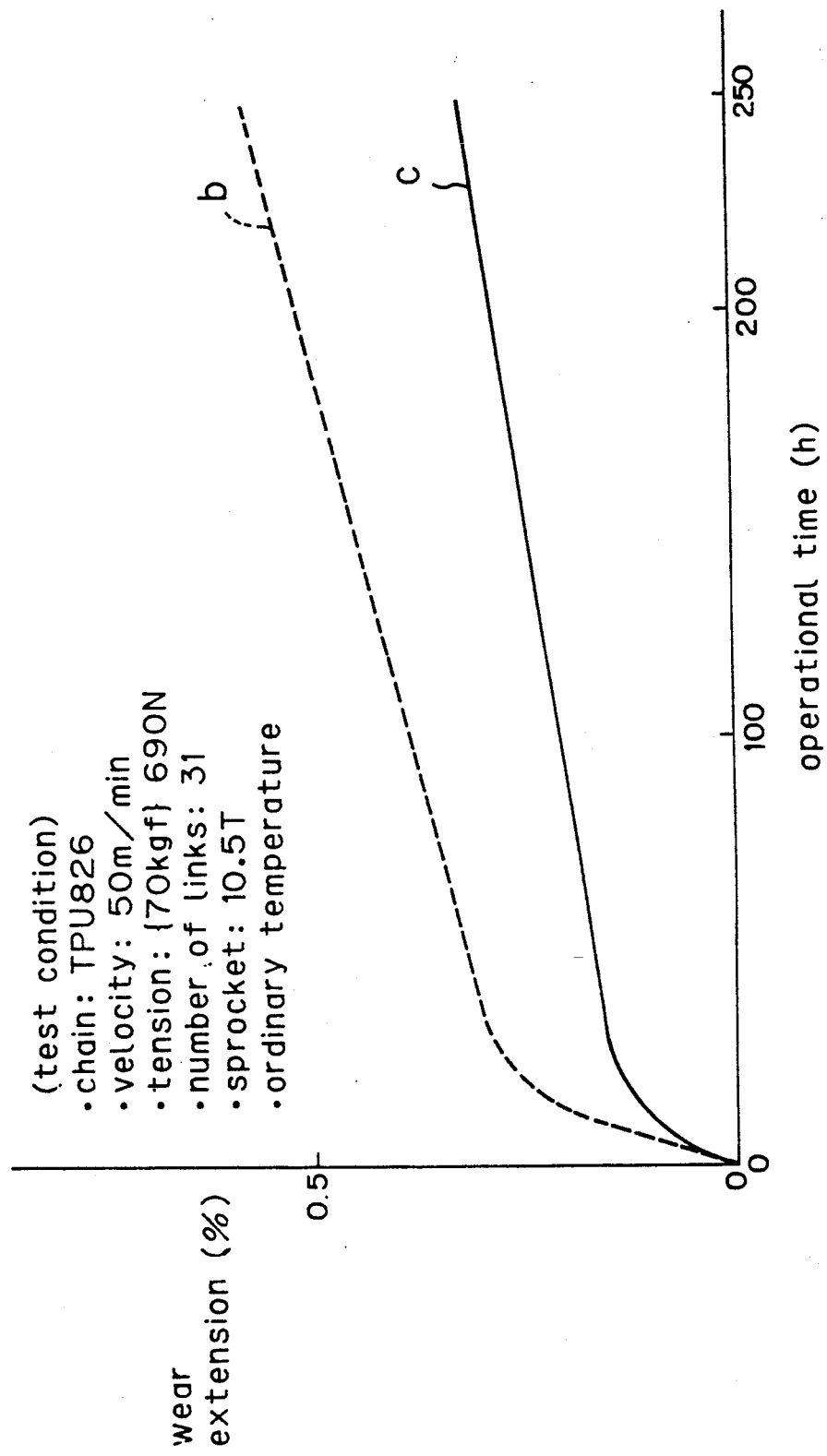

FLAT TOP CONVEYOR CHAIN

FIELD OF THE INVENTION

The present invention relates to conveyors for transporting articles. More particularly, the present invention relates flat top surfaces for flat links held together on conveyor chains, for use as accumulating conveyors and sorting conveyors for branching and joining articles and the like without halting the movement of the conveyor chain.

BACKGROUND OF THE INVENTION

Prior art flat top conveyor chains comprise a plurality of flat top links which are chained together by means of connection pins. In one form of conveyor, each of the flat top links are made from a polyacetal resin. In some prior art embodiments, a fluororesin is employed in an amount ranging from about 2 to 5% by weight.

In the prior system described above, where the fluororesin has been added, that addition is intended to reduce the sliding friction coefficient of the polyacetal resin to thereby improve the sliding characteristics of the articles on the flat top links. This facilitates the use of the conveyor to accumulate the articles on the flat top links, as well as branching and joining of various conveyors for sorting with a minimum of difficulty. One drawback with this system is that fluororesins have a negative effect upon the acetal resins by decreasing the strength of the resin, and therefore the chain, with an increase in the amount of fluororesin admixed with the polyacetal resin. Accordingly, the amount of fluororesin added to polyacetal resin is limited to about 2% to about 5% by weight, as mentioned above. This amount does not adversely effect the strength of the flat top link but also fails to sufficiently lower the sliding friction coefficient sufficiently to obtain desired benefits from the use of the resin.

Accordingly, it is object of the present invention to provide a flat top conveyor chain link which has satisfactory strength and which has a substantially lower coefficient of sliding friction than prior art devices.

Another object of the present invention is to provide a modification of prior art devices which is simple and easy to accomplish.

Other objects will appear hereinafter.

SUMMARY OF THE INVENTION

It has now been discovered that the above and other objects of the present invention maybe accomplished in the following manner. Specifically, it has been discovered that the sliding friction coefficient of polyacetal resins formed into flat top links of conveyor chains maybe substantially improved or reduced without any deleterious effects on the strengths of the resin. The new formulation comprises the conventional polyacetal resin to which has been added a long chain alkyl ester based lubricant. Formulations of the polyacetal resin with the long chain alkyl ester based lubricant may be formed into flat top links and connected together to constitute a conveyor chain.

BRIEF DESCRIPTION OF THE DRAWINGS

These and other objects of the present invention and the various features and details of the operation and construction thereof are hereinafter more fully set forth with reference to the accompanying drawings, where:

FIG. 4 is a comparative linear graph showing wear extension verses operational time;

DETAILED DESCRIPTION OF THE PREFERRED EMBODIMENT

Figure 1:
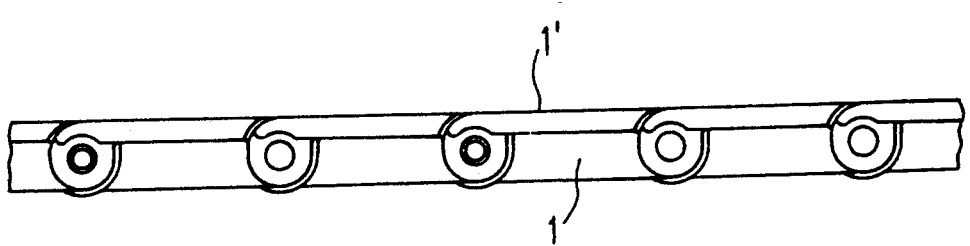
FIG. 1 is a side elevational view illustrating the principle components of a flat top conveyor chain.
Figure 2:
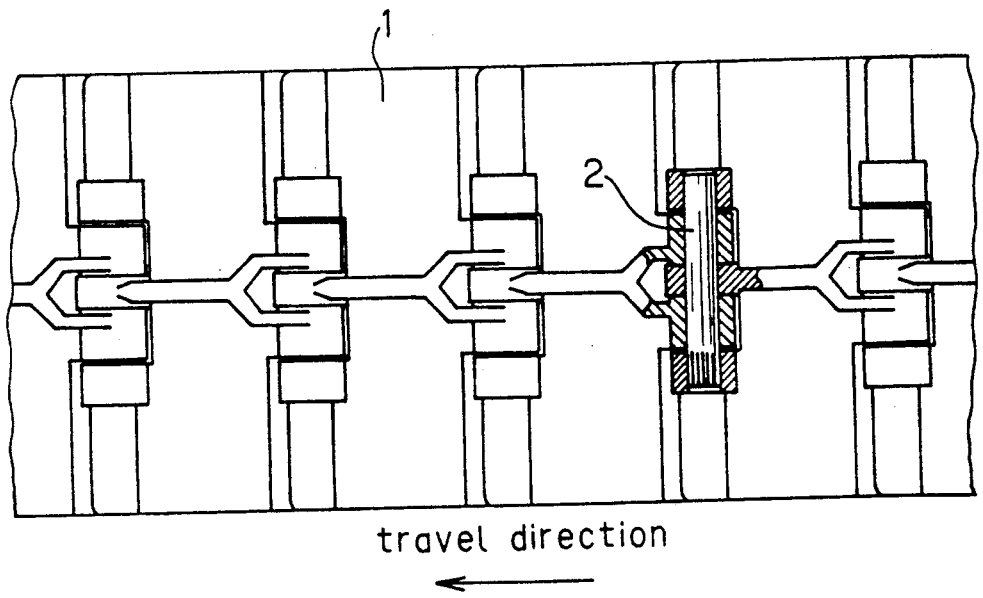
FIG. 2 is a bottom plan view of the device shown in FIG. 1.

As can be seen from FIG. 1, which is a side elevational view showing the main sections of the flat top chain, a plurality of flat top links 1 are connected with each other in the shape of a conveyor chain. As seen in FIG. 2, connecting pins 2 connect individual chain links together to thus constitute a conveyor chain. Articles to be carried by the conveyor chain are mounted on flat top surfaces 1' of the flat top links 1 and travel in the direction of the arrow in FIG. 2.

In accordance with the present invention, the long chain alkyl ester base lubricant is totally compatible with the polyacetal resin. Thus, the amount of lubricant added maybe increased as needed, thereby permitting the reduction of the sliding coefficient of friction by significant amount. As noted in FIG. 3, various products which might be carried on a conveyor of the type described herein have a coefficient of friction when sliding on the polyacetal resin flat top link, depending on the quality of the flat link surface. Specifically, the sliding coefficient of friction with no additive is shown by the line labeled with the letter a. Depending upon the product which is being conveyed by the conveyor, the coefficient of friction ranges from slightly over 0.2 to slightly over 0.3. Similarly, the prior chain having a fluororesin resin additive of between 2% and 5% shows slight improvement in some instances, as illustrated by line b. The remarkable improvement shown by line c in FIG. 3 illustrates a reduction in the sliding coefficient of friction by 15 to 25% over comparable values for curves A or B.

Figure 3:
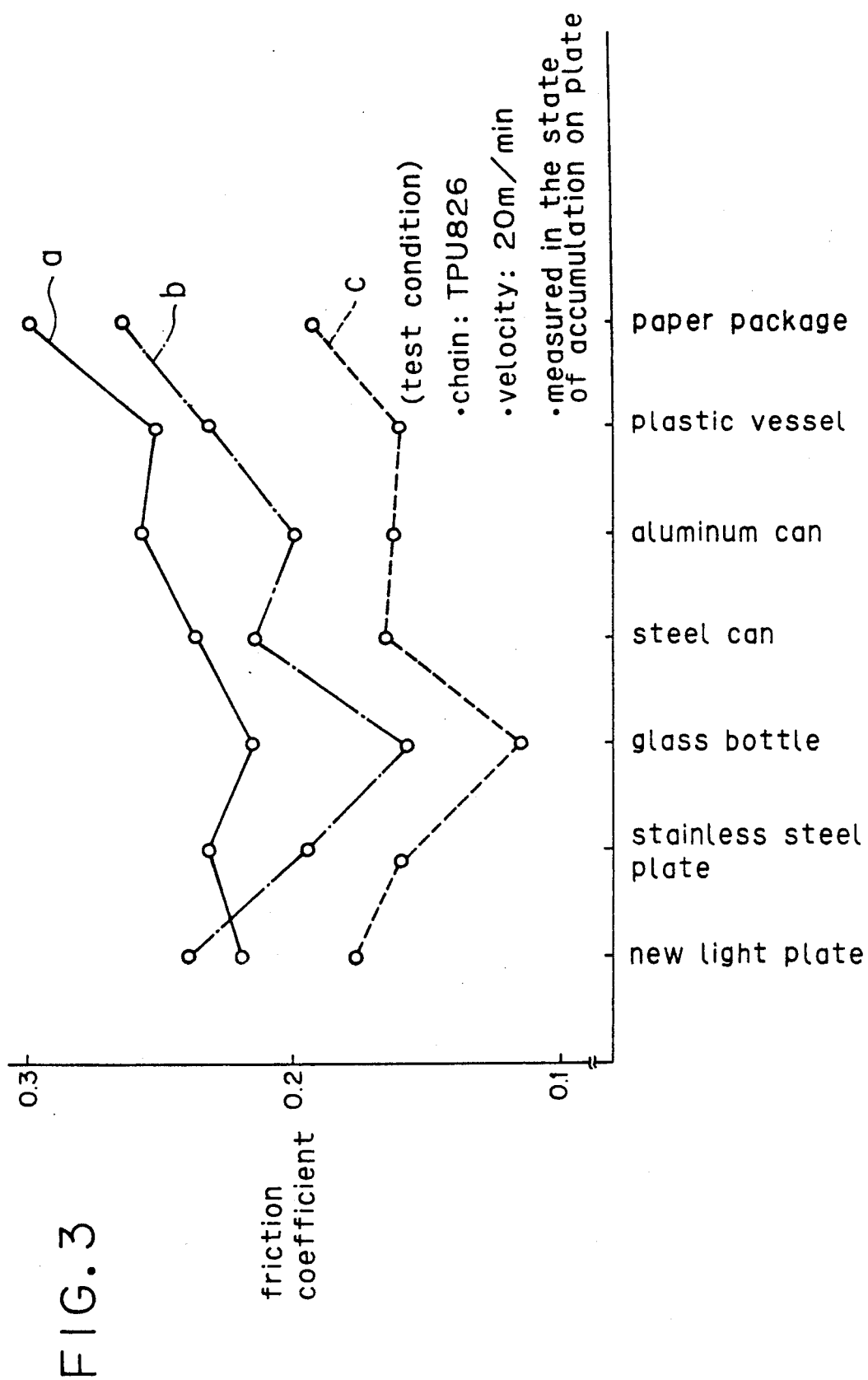
FIG. 3 is a comparative linear graph of the coefficient of friction illustrating the present invention.

As can be seen in FIG. 3, the ordinate indicates the coefficient of friction and the abscissa delineates the individual articles which have been loaded on top surfaces of flat top conveyor links. For every different material being carried by the conveyors, the flat top links formed by the present invention have the lowest friction coefficient. Thus, it is possible to smooth out the movement of the articles on a flat top link, and use that type of conveyor to accumulate articles as desired without tilting the articles on the flat top links and without stopping the conveyor.

As can be seen in FIG. 4 the wear resistance of the flat top links of the present invention is much improved in comparison with the prior art containing a fluororesin. In FIG. 4 the improvement over the prior art in which a fluorocarbon addition is used (graph b) and the present (graph c) clearly shows a remarkable improvement in wear extension.

Once again, linear graph b shows the fluorocarbon modified polyacetal resin of the prior art. Linear graph c shows the long chain alkyl ester base lubricant modified polyacetal resin of the present invention.

As is noted, it is possible to reduce the wear extension resulting in the increase wear resistance and improve the service life of the conveyor chain. Thus, both increased wear and decreased friction are achieved in the same manner, namely by practicing the present invention.

Although the invention has been shown and described with respect to particular embodiments thereof, it will be understood by the skilled in the art that various changes in form and detail maybe made with out departing from the spirit and scope of the claimed invention.

What is claimed is:

1. A flat top conveyor chain comprising a plurality of flat top links, each link having flat top surface for carrying articles, said links being chained by means of connecting pins to form a conveyor chain, said flat top link each being made from a polyacetal resin material having a long chain alkyl ester based lubricant therein.

2. The chain of claim 1 wherein, the amount of long chain alkyl ester base lubricant is sufficient to reduce the coefficient of friction of said link by from about 15% to about 25%.

* * * * *